United States Patent
Narai et al.

(10) Patent No.: US 8,861,048 B2
(45) Date of Patent: Oct. 14, 2014

(54) IMAGE SCANNER AND IMAGE FORMING APPARATUS INCORPORATING SAME

(71) Applicants: Satoshi Narai, Tokyo (JP); Yasunobu Youda, Kanagawa (JP); Taku Kudoh, Kanagawa (JP); Takayuki Andoh, Kanagawa (JP); Koji Hatayama, Kanagawa (JP); Yohei Osanai, Kanagawa (JP)

(72) Inventors: Satoshi Narai, Tokyo (JP); Yasunobu Youda, Kanagawa (JP); Taku Kudoh, Kanagawa (JP); Takayuki Andoh, Kanagawa (JP); Koji Hatayama, Kanagawa (JP); Yohei Osanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/896,732

(22) Filed: May 17, 2013

(65) Prior Publication Data

US 2013/0335790 A1 Dec. 19, 2013

(30) Foreign Application Priority Data

Jun. 18, 2012 (JP) .................................. 2012-136688

(51) Int. Cl.
| | | |
|---|---|---|
| *H04N 1/40* | (2006.01) | |
| *H04N 1/04* | (2006.01) | |
| *G03F 3/08* | (2006.01) | |
| *H04N 1/024* | (2006.01) | |
| *H04N 1/10* | (2006.01) | |
| *H04N 1/193* | (2006.01) | |
| *H04N 1/12* | (2006.01) | |

(52) U.S. Cl.
CPC .......... *H04N 1/0249* (2013.01); *H04N 1/1039* (2013.01); *H04N 1/0464* (2013.01); *H04N 1/1017* (2013.01); *H04N 1/193* (2013.01); *H04N 1/12* (2013.01); *H04N 2201/0456* (2013.01)
USPC .......... 358/497; 358/474; 358/498; 358/521; 358/465; 358/486

(58) Field of Classification Search
USPC .................. 358/497, 474, 498, 521, 465, 486
See application file for complete search history.

(56) References Cited

U.S. PATENT DOCUMENTS

| | | | | |
|---|---|---|---|---|
| 7,016,088 | B2 * | 3/2006 | Yokota et al. | 358/474 |
| 7,729,023 | B2 * | 6/2010 | Morikawa | 358/521 |
| 8,089,664 | B2 * | 1/2012 | Yokochi | 358/474 |
| 8,422,085 | B2 * | 4/2013 | Sakai et al. | 358/474 |

(Continued)

FOREIGN PATENT DOCUMENTS

| | | |
|---|---|---|
| JP | 10-075332 | 3/1998 |
| JP | 10-243181 | 9/1998 |
| JP | 11-127301 | 5/1999 |
| JP | 2007-013309 | 1/2007 |

(Continued)

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An image scanner includes a stationary original plate on which a stationary original is placed and a moving original plate, over which a moving original is conveyed, aligned with the stationary original plate in a sub-scanning direction and tilted relative to the stationary original plate by a given angle. A reader is movable in the sub-scanning direction between a stationary original reading span disposed opposite the stationary original via the stationary original plate to read an image on the stationary original and a moving original reading position disposed opposite the moving original via the moving original plate to read an image on the moving original. The reader pressingly contacts the stationary original plate and the moving original plate as the reader moves in the sub-scanning direction.

20 Claims, 9 Drawing Sheets

(56) References Cited

U.S. PATENT DOCUMENTS

| | | | |
|---|---|---|---|
| 2008/0068681 A1* | 3/2008 | Ishido | 358/498 |
| 2008/0198426 A1* | 8/2008 | Yokochi | 358/486 |
| 2009/0316229 A1* | 12/2009 | Sakai et al. | 358/474 |
| 2014/0118798 A1* | 5/2014 | Ikeno et al. | 358/465 |

FOREIGN PATENT DOCUMENTS

| | | |
|---|---|---|
| JP | 2007-097054 | 4/2007 |
| JP | 2010-161700 | 7/2010 |
| JP | 2011-086988 | 4/2011 |
| JP | 2011-171957 | 9/2011 |
| JP | 2012-023452 | 2/2012 |

* cited by examiner

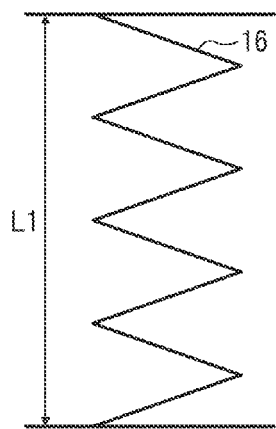
FIG. 20A
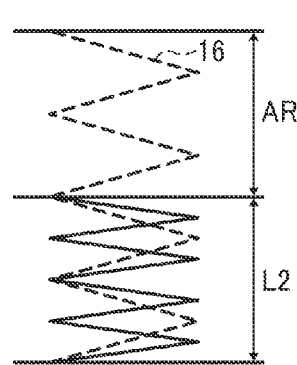
FIG. 20B
FIG. 20C
FIG. 21
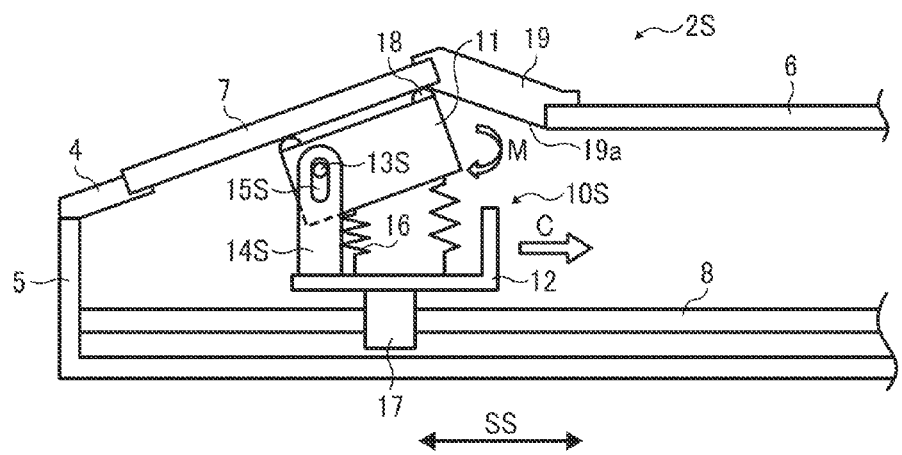

IMAGE SCANNER AND IMAGE FORMING APPARATUS INCORPORATING SAME

CROSS-REFERENCE TO RELATED APPLICATION

This patent application is based on and claims priority pursuant to 35 U.S.C. §119 to Japanese Patent Application No. 2012-136688, filed on Jun. 18, 2012, in the Japanese Patent Office, the entire disclosure of which is hereby incorporated by reference herein.

BACKGROUND OF THE INVENTION

1. Field of the Invention

Example embodiments generally relate to an image scanner and an image forming apparatus, and more particularly, to an image scanner for reading an image on an original and an image forming apparatus incorporating the image scanner.

2. Description of the Related Art

Related-art image forming apparatuses, such as copiers, facsimile machines, printers, or multifunction printers having at least one of copying, printing, scanning, and facsimile functions, typically form an image on a recording medium according to image data created by an image scanner that scans an image on an original. Such image scanner may be configured to read an image on either a stationary original placed on an exposure glass or a moving original moving over a glass strip.

For example, as shown in FIG. 1, a related-art image scanner 2R includes an exposure glass 21 on which a stationary original is placed stationarily and a glass strip 22 over which a moving original conveyed from an original tray 91 moves. A single reader 23 movable under the exposure glass 21 and the glass strip 22 reads an image on the stationary original and an image on the moving original. In order to read the image on the moving original, the reader 23 moves from a home position below the exposure glass 21 to a moving original reading position below the glass strip 22. As the reader 23 halts at the moving original reading position, the reader 23 reads the image on the moving original moving over the glass strip 22.

The image scanner 2R may be connected to an auto document feeder (ADF) 120 that loads and feeds a plurality of originals successively. Since rigid originals such as cards are not bent flexibly, a straight conveyance path 101 extends from the original tray 91 to an output tray to convey the rigid originals straight without bending them. The straight conveyance path 101 is provided with a conveyance roller pair 97 situated upstream from the glass strip 22 and a conveyance roller pair 98 situated downstream from the glass strip 22 in an original conveyance direction, which convey the original over the glass strip 22. In order to prohibit the conveyance roller pair 97 from striking the exposure glass 21, the glass strip 22 constituting the straight conveyance path 101 is tilted with respect to the exposure glass 21.

Since the glass strip 22 is tilted relative to the exposure glass 21, if the reader 23 moves horizontally from the home position below the exposure glass 21 to the moving original reading position below the glass strip 22, the vertical distance between the reader 23 and the glass strip 22 is greater than that between the reader 23 and the exposure glass 21. The difference between those distances may degrade performance of the reader 23 that reads the image on the stationary original placed on the exposure glass 21 and the image on the moving original moving over the glass strip 22.

Additionally, since the exposure glass 21 is parallel to the reader 23, light emitted from the reader 23 irradiates the stationary original placed on the exposure glass 21 vertically. Conversely, the glass strip 22 tilted relative to the exposure glass 21 is also tilted relative to the reader 23. Accordingly, the optical axis of light emitted from the reader 23 to the moving original moving over the glass strip 22 is not perpendicular to the glass strip 22, thus degrading performance of the reader 23 that reads the image on the moving original moving over the glass strip 22.

SUMMARY OF THE INVENTION

At least one embodiment may provide an image scanner that includes a stationary original plate on which a stationary original is placed and a moving original plate, over which a moving original is conveyed, aligned with the stationary original plate in a sub-scanning direction and tilted relative to the stationary original plate by a given angle. A reader is movable in the sub-scanning direction between a stationary original reading span disposed opposite the stationary original via the stationary original plate to read an image on the stationary original and a moving original reading position disposed opposite the moving original via the moving original plate to read an image on the moving original. The reader pressingly contacts the stationary original plate and the moving original plate as the reader moves in the sub-scanning direction.

At least one embodiment may provide an image forming apparatus including the image scanner described above.

Additional features and advantages of example embodiments will be more fully apparent from the following detailed description, the accompanying drawings, and the associated claims.

BRIEF DESCRIPTION OF THE SEVERAL VIEWS OF THE DRAWINGS

A more complete appreciation of example embodiments and the many attendant advantages thereof will be readily obtained as the same becomes better understood by reference to the following detailed description when considered in connection with the accompanying drawings, wherein:

FIG. 20A is a diagram illustrating a spring incorporated in the first readers shown in FIGS. 8 and 12 applied with no force;

FIG. 20B is a diagram illustrating the spring shown in FIG. 20A applied with a force;

FIG. 20C is a diagram illustrating the spring shown in FIG. 20A applied with a substantial force; and FIG. 21 is a partial vertical sectional view of the image scanner illustrating the first reader shown in FIG. 13 coming into contact with a boundary between a glass strip and a slope incorporated in the image scanner.

Figure 1:
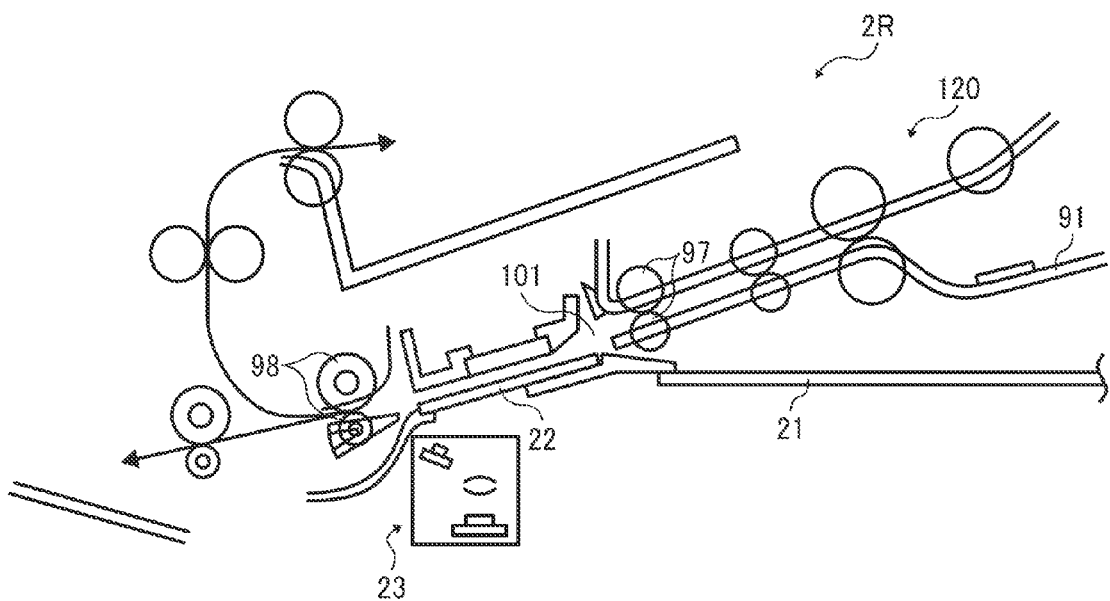
FIG. 1 is a schematic vertical sectional view of a related-art image scanner.

The accompanying drawings are intended to depict example embodiments and should not be interpreted to limit the scope thereof. The accompanying drawings are not to be considered as drawn to scale unless explicitly noted.

DETAILED DESCRIPTION OF THE INVENTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 2:
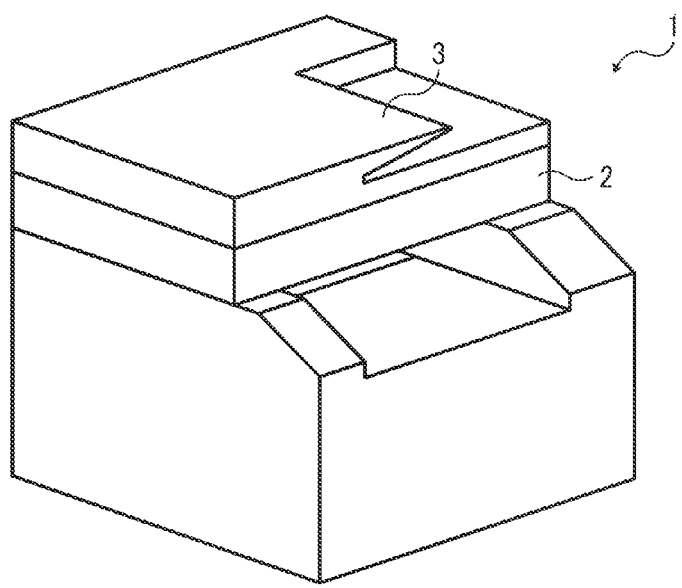
FIG. 2 is a schematic vertical sectional view of an image forming apparatus according to an example embodiment of the present invention.

Referring now to the drawings, wherein like reference numerals designate identical or corresponding parts throughout the several views, particularly to FIG. 2, an image forming apparatus 1 according to an example embodiment is explained.

FIG. 2 is an external perspective view of the image forming apparatus 1. The image forming apparatus 1 may be a copier, a facsimile machine, a printer, a multifunction printer (MFP) having at least one of copying, printing, scanning, plotter, and facsimile functions, or the like. For example, the image forming apparatus 1 forms color and monochrome images on recording media with toner by electrophotography or with ink by inkjet printing.

As shown in FIG. 2, the image forming apparatus 1 includes an image scanner 2 located in an upper portion thereof. An auto document feeder (ADF) 3 is disposed atop the image forming apparatus 1, that is, on the image scanner 2, such that the ADF 3 is supported in hinged relationship to the image scanner 2.

Figure 3:
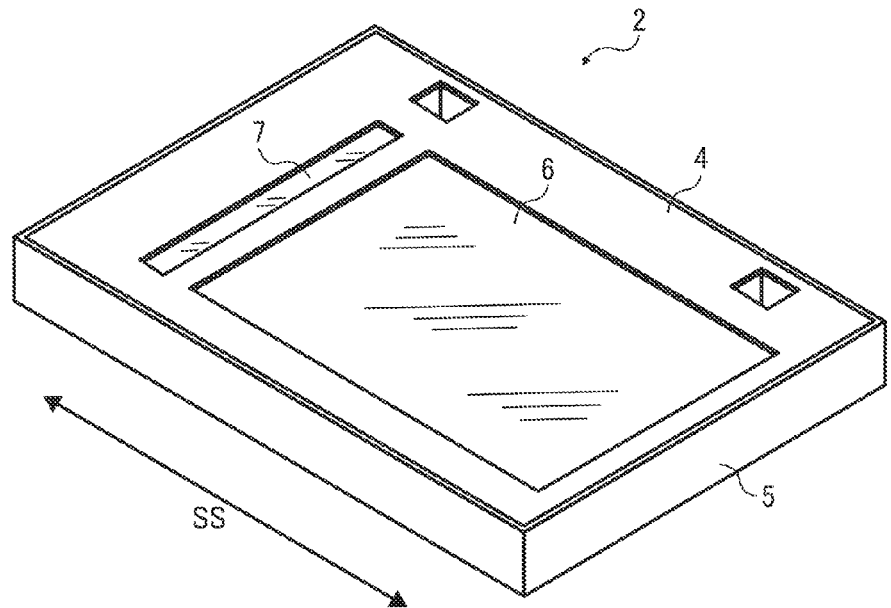
FIG. 3 is an external perspective view of an image scanner according to a first example embodiment of the present invention that is installed in the image forming apparatus shown in FIG. 2.

FIG. 3 is an external perspective view of the image scanner 2. As shown in FIG. 3, the image scanner 2 includes a scanner frame 5 and a scanner cover 4 mounted thereon, which are formed into a substantially flat box. The scanner cover 4 is embedded with an exposure glass 6 and a glass strip 7 aligned in a longitudinal direction of the scanner cover 4 parallel to a sub-scanning direction SS. The exposure glass 6 is made of a transparent material and serves as a stationary original plate where an original bearing an image is placed stationarily. The glass strip 7 is made of a transparent material and serves as a moving original plate where an original bearing an image passes.

Figure 4:
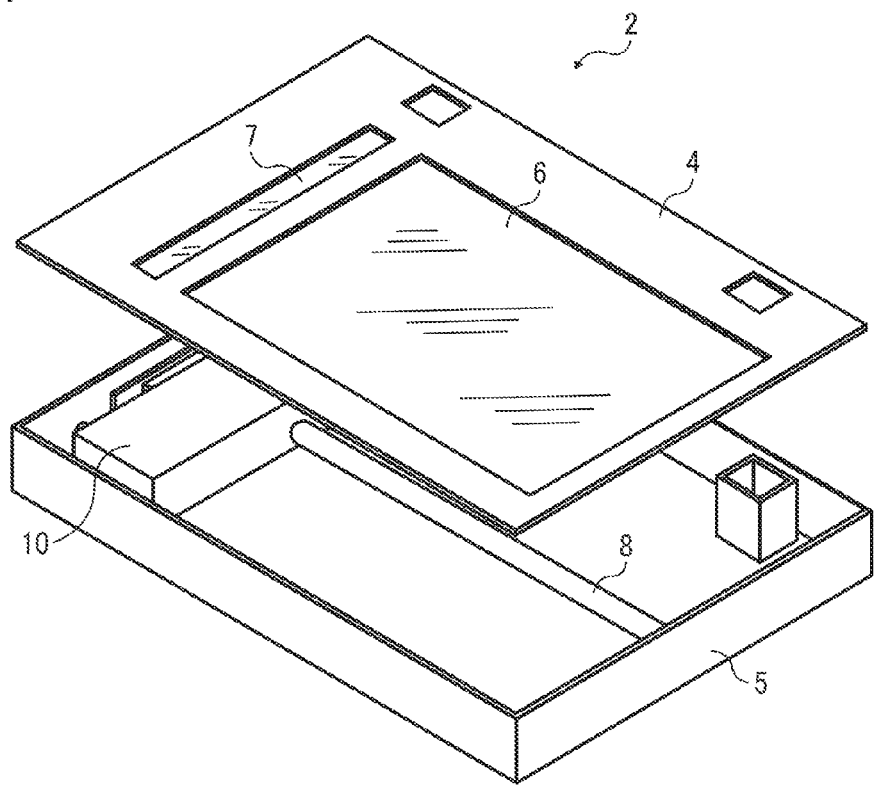
FIG. 4 is an exploded perspective view of the image scanner shown in FIG. 3.

FIG. 4 is an exploded perspective view of the image scanner 2. Below the scanner cover 4 and inside the scanner frame 5 is a first reader 10 slidably mounted on and guided by a guide rod 8 extending parallel to the exposure glass 6. The first reader 10, as it slides over the guide rod 8, scans and reads the image on the original. The first reader 10 accommodates a contact image sensor (CIS) and a light source (e.g., a luminaire) described below.

Figure 5:
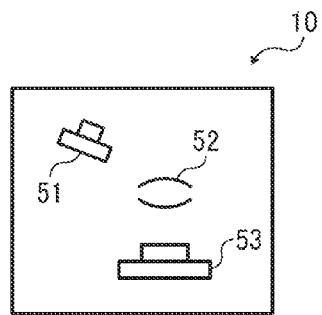
FIG. 5 is a schematic vertical sectional view of a first reader incorporated in the image scanner shown in FIG. 4.

With reference to FIG. 5, a description is provided of a construction of the first reader 10.

FIG. 5 is a schematic vertical sectional view of the first reader 10. As shown in FIG. 5, the first reader 10 includes a light-emitting diode (LED) 51 serving as a light source, a lens 52, and a charge-coupled device (CCD) 53. The LED 51 emits light onto an original placed on the exposure glass 6 through the exposure glass 6 or an original moving over the glass strip 7 through the glass strip 7. The light reflected by the original passes through the lens 52. Thereafter, the light enters the CCD 53 that converts the light into an electric signal, thus producing image data.

Figure 6:
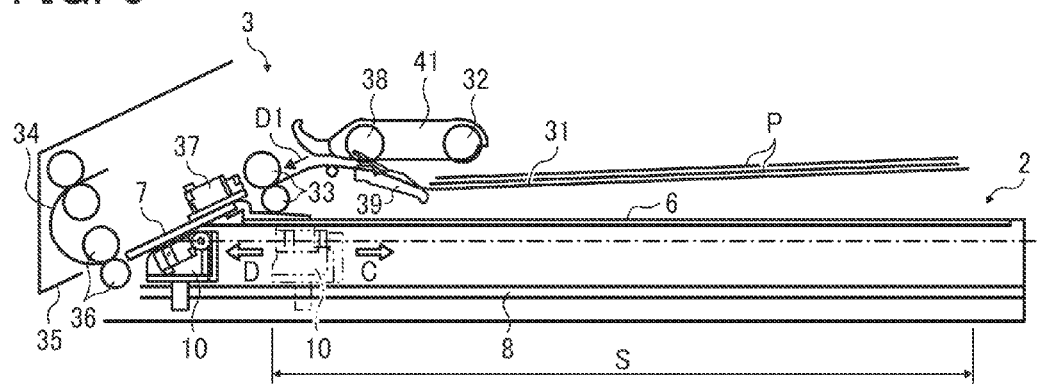
FIG. 6 is a vertical sectional view of an auto document feeder attached to the image forming apparatus shown in FIG. 2 and the image scanner shown in FIG. 3.
Figure 7:
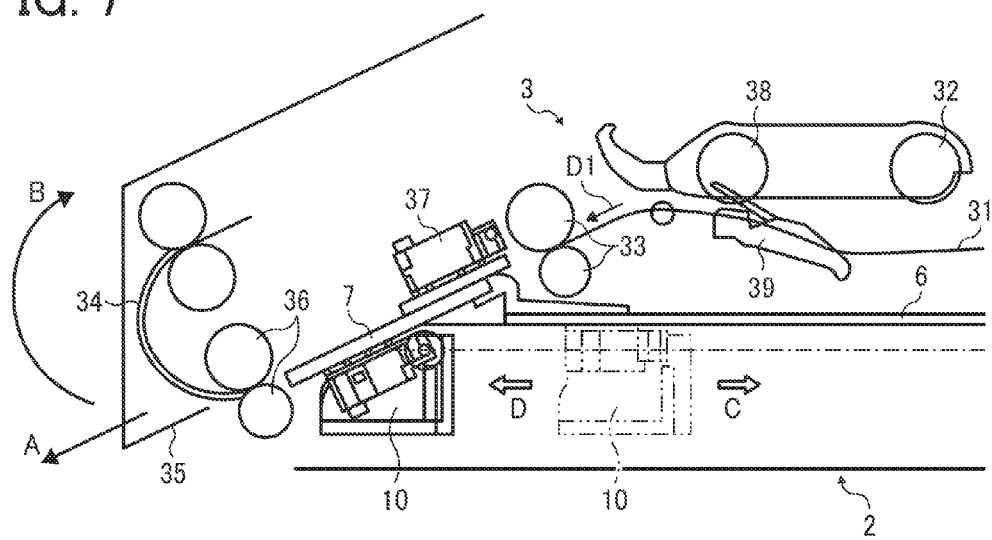
FIG. 7 is a partially enlarged vertical sectional view of the auto document feeder and the image scanner shown in FIG. 6.

FIG. 6 is a vertical sectional view of the ADF 3 and the image scanner 2. FIG. 7 is a partially enlarged vertical sectional view of the ADF 3 and the image scanner 2. It is to be noted that FIGS. 6 and 7 schematically illustrate a part of the ADF 3 situated in proximity to the image reader 2.

With reference to FIGS. 6 and 7, a description is provided of an image reading operation of the image scanner 2 for reading an image on an original conveyed through the ADF 3.

Originals P (e.g., sheets and cards) each bearing an image to be read are placed on an original tray 31. As a user inputs an instruction to start the image reading operation by using a control panel disposed atop the image forming apparatus 1, a lever 41 pivotable about a shaft of a separation roller 38 pivots clockwise in FIG. 6, thus moving a pickup roller 32 rotatably mounted on the lever 41 downward. Accordingly, the pickup roller 32 comes into contact with an uppermost original P placed on the original tray 31, picking up and feeding the original P toward the separation roller 38 in an original conveyance direction D1. The separation roller 38 and a separation pad 39 movably mounted on the lever 41 separate the uppermost original P picked up by the pickup roller 32 from other originals P and feeds the uppermost original P to a conveyance roller pair 33 disposed downstream from the separation roller 38 and the separation pad 39 in the original conveyance direction D1. The conveyance roller pair 33 conveys the original P onto the glass strip 7 where the image on the original P is read.

On the other hand, before the original P reaches the glass strip 7, the first reader 10 moves in a moving direction D from a home position where the first reader 10 is illustrated in the dotted line to a moving original reading position where the first reader 10 is illustrated in the solid line. Thus, the first reader 10 below the glass strip 7 waits for the original P at the moving original reading position. As the original P moves over the glass strip 7, the first reader 10 reads the image on the original P.

As shown in FIG. 7, after the original P passes over the glass strip 7, if the original P is a relatively thin, flexible sheet, a conveyance roller pair 36 disposed downstream from the glass strip 7 in the original conveyance direction D1 conveys the original P to a reverse conveyance path 34 curved to convey the original P upward in a direction B to an upper output tray located above the original tray 31. Thus, the originals P conveyed from the original tray 31 successively are stacked on the output tray.

Conversely, if the original P is a relatively thick, rigid sheet, the original P is not conveyed through the curved reverse conveyance path 34 but is conveyed through a straight conveyance path 35.

The straight conveyance path 35 extends from the glass strip 7. Since the conveyance roller pairs 33 and 36 are situated upstream and downstream from the glass strip 7, respectively, in the original conveyance direction D1, the glass strip 7 is tilted relative to the exposure glass 6 by a given angle. The straight conveyance path 35 extending from the glass strip 7 is tilted relative to the exposure glass 6 by an angle substantially identical to the given angle by which the glass strip 7 is tilted relative to the exposure glass 6. The relatively thick, rigid original P is conveyed through the straight conveyance path 35 in a direction A toward a side output tray mounted on a side of the ADF 3. Thus, the originals P conveyed through the straight conveyance path 35 successively are stacked on the side output tray.

The original P may bear an image on both front and back sides thereof. To address this circumstance, a second reader 37 is disposed above the glass strip 7. Since the original P is placed on the original tray 31 facing down, an image on the front side of the original P is read by the lower first reader 10 and an image on the back side of the original P is read by the upper second reader 37. Thus, while the original P is conveyed over the glass strip 7 once, the image on the back side of the original P is read by the second reader 37 and the image on the front side of the original P is read by the first reader 10.

With reference to FIGS. 6 and 7, a description is provided of an image reading operation of the image scanner 2 for reading an image on an original P placed on the exposure glass 6.

The ADF 3 is supported in hinged relationship to the image scanner 2 such that the ADF 3 is swingable about a shaft mounted on a rear of the image scanner 2. The user lifts the ADF 3, places the original P on the exposure glass 6, and lowers the ADF 3 to press the original P against the image scanner 2. As the user inputs an instruction to start the image reading operation by using the control panel, the first reader 10 slides over the guide rod 8 in a moving direction C from the home position where the first reader 10 is illustrated in the dotted line. Then, the first reader 10 moves back to the home position. Thus, as the first reader 10 moves back and forth over a stationary original reading span S where the home position is situated, the first reader 10 scans and reads the image on the original P stationarily placed on the exposure glass 6.

Figure 8:
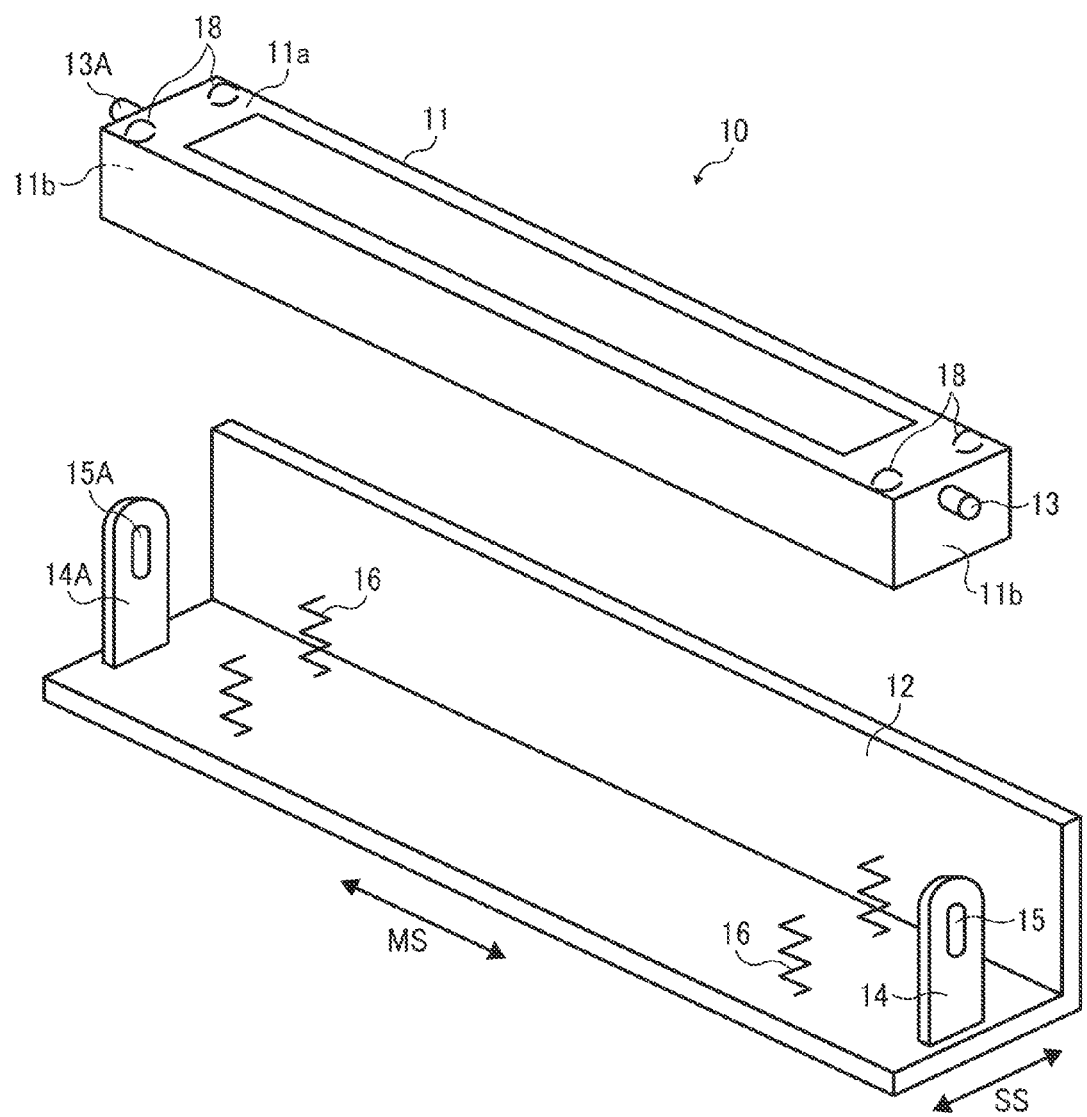
FIG. 8 is an exploded perspective view of the first reader shown in FIG. 5.

With reference to FIG. 8, a detailed description is now given of a construction of the first reader 10 according to a first example embodiment.

FIG. 8 is an exploded perspective view of the first reader 10. The first reader 10 serves as a reader that reads the image on the original P. The first reader 10 includes an optical scanner unit 11 and a bracket 12. The optical scanner unit 11 serves as a scanner assembly, that is, a CIS or an optical scanner unit including the LED 51, the lens 52, the CCD 53, and a mirror, as shown in FIG. 5. The bracket 12 serves as a support for supporting the optical scanner unit 11. Pins 13 and 13A are mounted on both side faces 11b of the optical scanner unit 11 in a longitudinal direction thereof parallel to a main scanning direction MS, respectively, such that the pins 13 and 13A project outward. Arms 14 and 14A are mounted on both lateral ends of the bracket 12 in a longitudinal direction thereof parallel to the main scanning direction MS, respectively, such that the arms 14 and 14A project toward the optical scanner unit 11. Elongate through-holes 15 and 15A are produced through the arms 14 and 14A to engage the pins 13 and 13A, respectively. The elongate through-holes 15 and 15A elongate vertically. A diameter of each of the pins 13 and 13A is slightly smaller than a short diameter of each of the elongate through-holes 15 and 15A in a short direction thereof parallel to a sub-scanning direction SS.

Springs 16 anchored to the bracket 12 and the optical scanner unit 11 are sandwiched between the bracket 12 and the optical scanner unit 11. The springs 16 serve as biasing members that bias the optical scanner unit 11 upward. According to this example embodiment, the four springs 16 are used as biasing members. Alternatively, rubber biasing members may be used instead of the springs 16. Additionally, the number of the springs 16 and the number of the rubber biasing members are not limited to four.

Each of the pins 13 and 13A is situated at a center on each side face 11b of the optical scanner unit 11 in the sub-scanning direction SS and in proximity to an upper face 11a of the optical scanner unit 11. Alternatively, each of the pins 13 and 13A may be situated at an arbitrary position on each side face 11b of the optical scanner unit 11 as long as the pins 13 and 13A are on an identical axis and so positioned as not to interfere with other components of the image scanner 2 depicted in FIG. 6.

Figure 9:
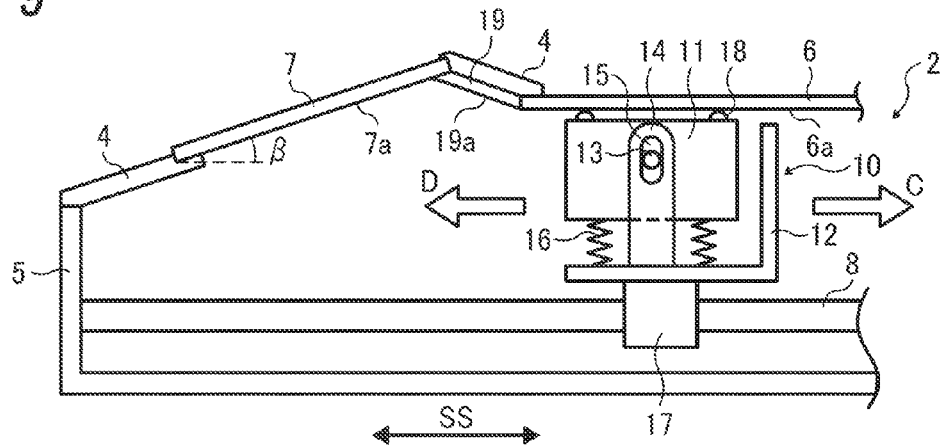
FIG. 9 is a partial vertical sectional view of the image scanner shown in FIG. 7 illustrating the first reader incorporated therein that is situated at a home position.
Figure 10:
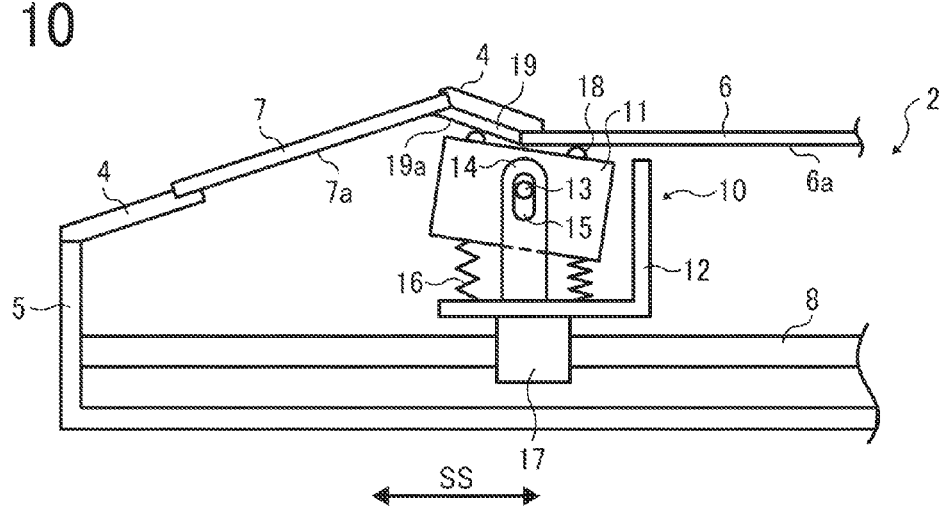
FIG. 10 is a partial vertical sectional view of the image scanner shown in FIG. 7 illustrating the first reader incorporated therein that is situated at an intermediate position between the home position and a moving original reading position.

With reference to FIGS. 8 to 10, a description is provided of movement of the first reader 10.

Figure 11:
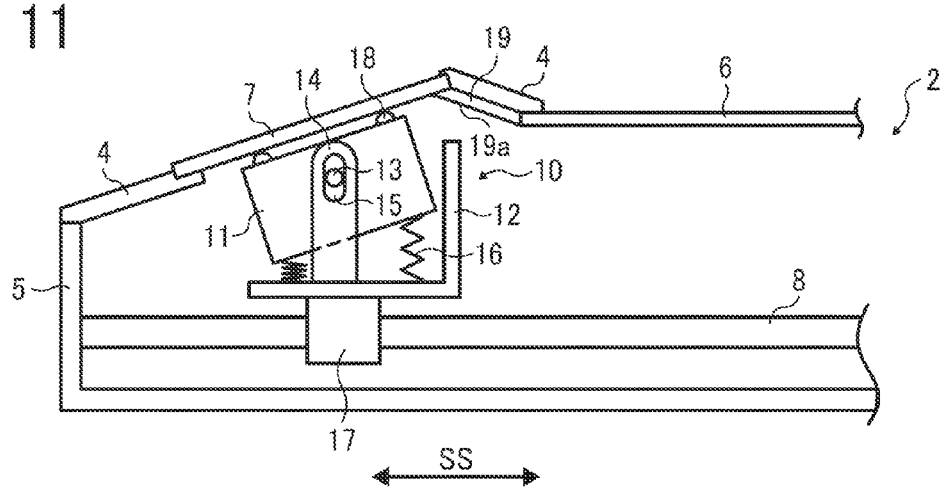
FIG. 11 is a partial vertical sectional view of the image scanner shown in FIG. 7 illustrating the first reader incorporated therein that is situated at the moving original reading position.

FIG. 9 is a partial vertical sectional view of the image scanner 2 illustrating the first reader 10 situated at the home position. FIG. 10 is a partial vertical sectional view of the image scanner 2 illustrating the first reader 10 situated at an intermediate position between the home position and the moving original reading position. FIG. 11 is a partial vertical sectional view of the image scanner 2 illustrating the first reader 10 situated at the moving original reading position.

As shown in FIG. 9, a lower face of the bracket 12 is mounted with a leg 17 having a through-hole engaging the guide rod 8. A driver connected to the leg 17 drives and moves the leg 17 on the guide rod 8 in the directions C and D. In a state in which the image scanner 2 is installed in the image forming apparatus 1 depicted in FIG. 2, the springs 16 bias the optical scanner unit 11 upward against the exposure glass 6 resiliently as shown in FIG. 9. In order to decrease friction between the optical scanner unit 11 and the exposure glass 6, a plurality of domical bosses 18 is mounted on the upper face 11a of the optical scanner unit 11 as shown in FIG. 8, that is, an opposed face disposed opposite the exposure glass 6 and the glass strip 7. As shown in FIG. 8, according to this example embodiment, the four bosses 18 are situated in proximity to four corners on the upper face 11a of the optical scanner unit 11 symmetrically.

FIG. 9 illustrates the first reader 10 at the home position. While the first reader 10 reads the image on the original P placed on the exposure glass 6 stationarily, the driver moves and slides the first reader 10 along the guide rod 8 from the home position shown in FIG. 9 in the direction C parallel to the sub-scanning direction SS over the stationary original reading span S depicted in FIG. 6 and returns to the home position. Conversely, before the first reader 10 reads the image on the original P conveyed over the glass strip 7 by the ADF 3, the driver moves and slides the first reader 10 along the guide rod 8 from the home position shown in FIG. 9 in the direction D through the intermediate position shown in FIG. 10 to the moving original reading position shown in FIG. 11 until the first reader 10 halts at the moving original reading position. As the first reader 10 halts at the moving original reading position where the first reader 10 is below the glass strip 7, the first reader 10 reads the image on the original P, that is, a moving original conveyed over the glass strip 7 by the conveyance roller pair 33 depicted in FIG. 6.

As shown in FIG. 9, since the glass strip 7 is tilted relative to the exposure glass 6 by a given angle β, the scanner cover 4 bridged across the exposure glass 6 and the glass strip 7 produces a slope 19 sloping upward from the exposure glass 6 to the glass strip 7. As the first reader 10 moves from the home position shown in FIG. 9 to the moving original reading position shown in FIG. 11 below the glass strip 7 where the first reader 10 reads the image on the original P moving over the glass strip 7, the first reader 10 is tilted upward along the slope 19 of the scanner cover 4 while moving under the slope 19 through the intermediate position shown in FIG. 10. After the first reader 10 comes into contact with the glass strip 7, the first reader 10 is tilted downward along the tilted glass strip 7 while moving under the glass strip 7 as shown in FIG. 11.

As shown in FIG. 8, the pins 13 and 13A mounted on the optical scanner unit 11 engage the elongate through-holes 15 and 15A produced through the arms 14 and 14A, respectively. Additionally, the springs 16 bias the optical scanner unit 11 upward. Accordingly, the optical scanner unit 11 moves in a state in which the bosses 18 mounted on the upper face 11a thereof contact and slide over an opposed face 6a of the exposure glass 6, an opposed face 19a of the slope 19, and an opposed face 7a of the glass strip 7 as shown in FIGS. 9 to 11. As shown in FIG. 9, a lower face of the scanner cover 4 bridged across the exposure glass 6 and the glass strip 7 is attached with the slope 19. The slope 19 facilitates smooth movement of the optical scanner unit 11 from the stationary original reading span S below the exposure glass 6 to the moving original reading position below the glass strip 7 while the first reader 10 slides over the exposure glass 6 and the glass strip 7 as the first reader 10 moves from the home position shown in FIG. 9 through the intermediate position shown in FIG. 10 to the moving original reading position shown in FIG. 11. For example, the opposed face 19a of the slope 19 contacted by the bosses 18 of the optical scanner unit 11 is contiguous to the opposed face 6a of the exposure glass 6 and the opposed face 7a of the glass strip 7 so that the opposed face 6a of the exposure glass 6, the opposed face 19a of the slope 19, and the opposed face 7a of the glass strip 7 are formed into an identical surface.

In order to read the image on the original P precisely, the optical scanner unit 11 of the first reader 10 is requested to satisfy three conditions below. A first condition is that the optical scanner unit 11 is parallel to the opposed face 6a of the exposure glass 6 and the opposed face 7a of the glass strip 7. A second condition is that the optical scanner unit 11 is spaced apart from the exposure glass 6 and the glass strip 7 with a given interval corresponding to the depth of focus of the optical scanner unit 11. A third condition is that the optical axis of light emitted from the optical scanner unit 11 is perpendicular to the opposed face 6a of the exposure glass 6 and the opposed face 7a of the glass strip 7.

A detailed description is now given of the first and second conditions.

If the first reader 10 does not incorporate the springs 16 and therefore the optical scanner unit 11 moves horizontally from the home position below the exposure glass 6 to the moving original reading position below the glass strip 7, the vertical distance between the optical scanner unit 11 and the glass strip 7 is greater than that between the optical scanner unit 11 and the exposure glass 6. If the optical scanner unit 11 is an optical reducer producing an increased depth of focus, the difference between those vertical distances may not adversely affect performance of the optical scanner unit 11 for reading the image on the original P. However, if the optical scanner unit 11 is a CIS producing a decreased depth of focus, the difference between those vertical distances may degrade performance of the CIS.

For example, even if the vertical distance between the CIS and the exposure glass 6 is determined according to the depth of focus of the CIS to improve quality of reading the image on the original P placed on the exposure glass 6, since the vertical distance between the CIS and the glass strip 7 is greater than that between the CIS and the exposure glass 6, the CIS may not read the image on the original P moving over the glass strip 7 precisely with the depth of focus of the CIS that is suitable for the vertical distance between the CIS and the exposure glass 6.

A detailed description is now given of the third condition.

Even if the optical axis of light emitted from the optical scanner unit 11 is configured to be perpendicular to the exposure glass 6 to improve quality of reading the image on the original P placed on the exposure glass 6, the glass strip 7 tilted relative to the exposure glass 6 is also tilted relative to the optical scanner unit 11. Accordingly, if the optical scanner unit 11 moves horizontally from the home position below the exposure glass 6 to the moving original reading position below the glass strip 7, the optical axis of light emitted from the optical scanner unit 11 to the glass strip 7 is not perpendicular to the glass strip 7, thus degrading quality of reading the image on the original P moving over the glass strip 7.

The optical scanner unit 11 is supported by the bracket 12 such that it is vertically movable as the pins 13 and 13A mounted on the optical scanner unit 11 move in the elongate through-holes 15 and 15A produced through the arms 14 and 14A mounted on the bracket 12, respectively. The springs 16 constantly press the optical scanner unit 11 upward so that the bosses 18 mounted on the upper face 11a of the optical scanner unit 11 constantly contact the opposed face 6a of the exposure glass 6, the opposed face 19a of the slope 19, and the opposed face 7a of the glass strip 7 as the optical scanner unit 11 moves in the sub-scanning direction SS. Accordingly, while the first reader 10 reads the image on the original P, an optical axis of light emitted from the optical scanner unit 11 is perpendicular to the exposure glass 6 and the glass strip 7. Additionally, an interval between the optical scanner unit 11 and the exposure glass 6 is retained identical to an interval between the optical scanner unit 11 and the glass strip 7. Consequently, the first reader 10 reads the image on the original P precisely for both moving original reading for reading the original P moving over the glass strip 7 and stationary original reading for reading the original P placed on the exposure glass 6.

With the configuration of the first reader 10 described above, the single reader, that is, the first reader 10, reads the image on the original P precisely even if the glass strip 7 over which the original P conveyed through the ADF 3 moves is tilted relative to the exposure glass 6 on which the original P is placed stationarily by the given angle β.

Figure 12:
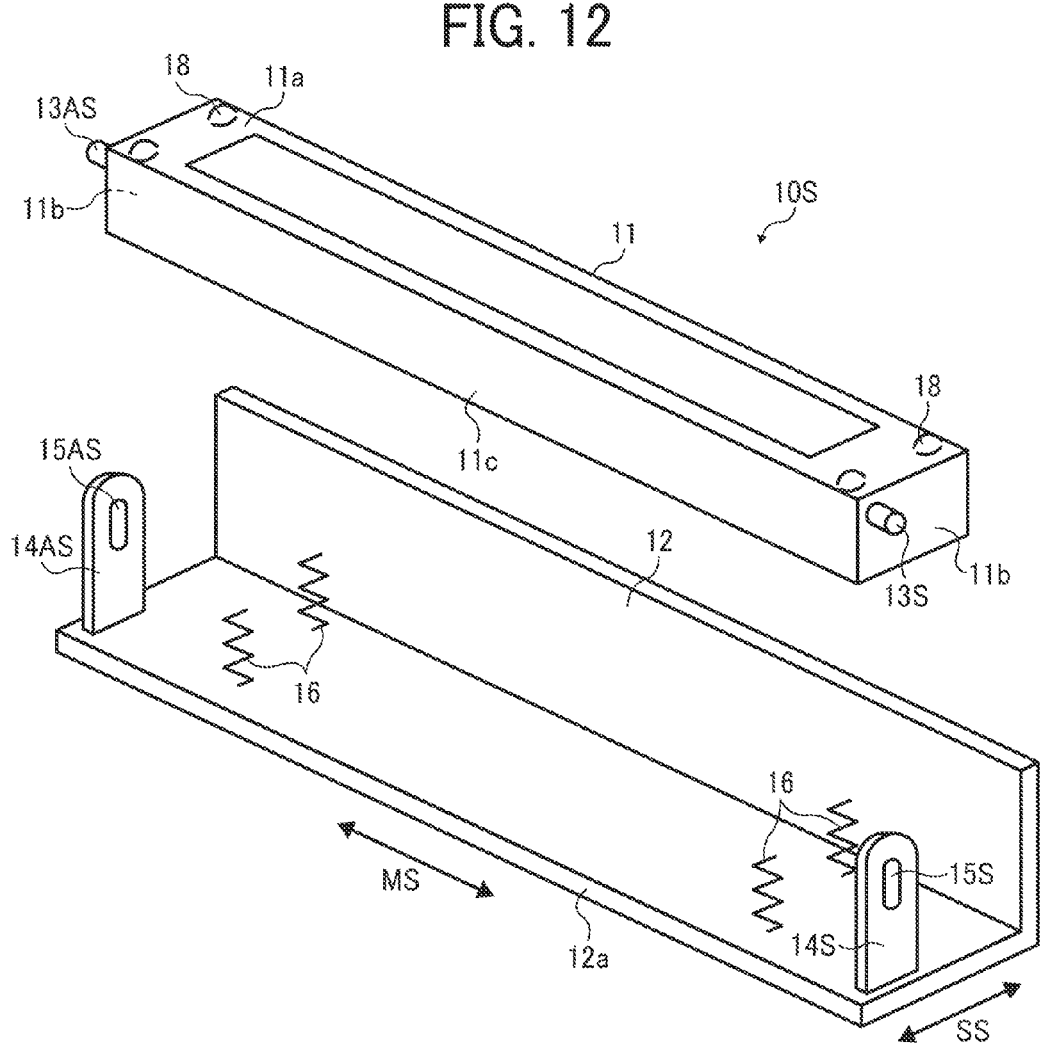
FIG. 12 is an exploded perspective view of a first reader according to a second example embodiment of the present invention.

With reference to FIG. 12, a description is provided of a construction of a first reader 10S according to a second example embodiment.

FIG. 12 is an exploded perspective view of the first reader 10S. The first reader 10S differs from the first reader 10 depicted in FIG. 8 in that arms 14S and 14AS mounted on the bracket 12 and pins 13S and 13AS mounted on the optical scanner unit 11 of the first reader 10S are positioned differently from the arms 14 and 14A and the pins 13 and 13A of the first reader 10. For example, unlike the arms 14 and 14A mounted on the center of the bracket 12 in the sub-scanning direction SS shown in FIG. 8, each of the arms 14S and 14AS is mounted on the bracket 12 at a position in proximity to a lower edge 12a of the bracket 12 that faces the glass strip 7. Similarly, each of the pins 13S and 13AS is mounted on each side face 11b of the optical scanner unit 11 at a position in proximity to a downstream face 11c of the optical scanner unit 11 that faces the glass strip 7.

Figure 13:
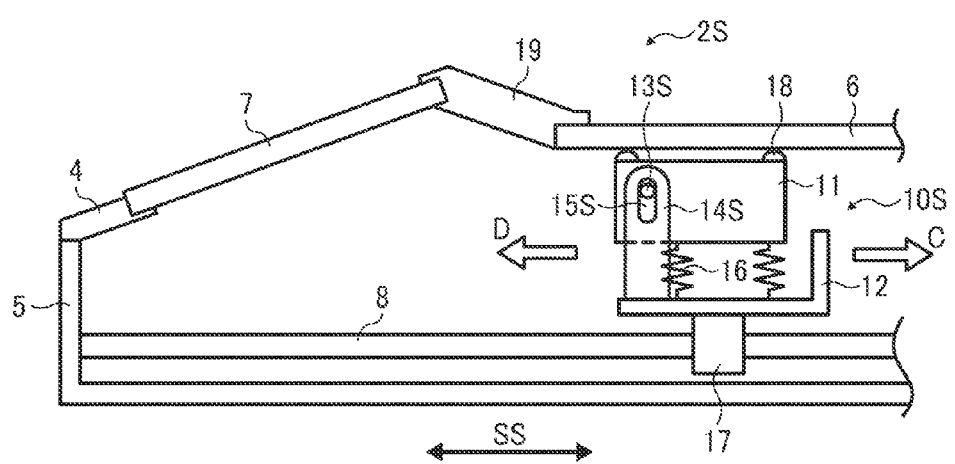
FIG. 13 is a partial vertical sectional view of an image scanner illustrating the first reader shown in FIG. 12 incorporated therein and situated at the home position.
Figure 14:
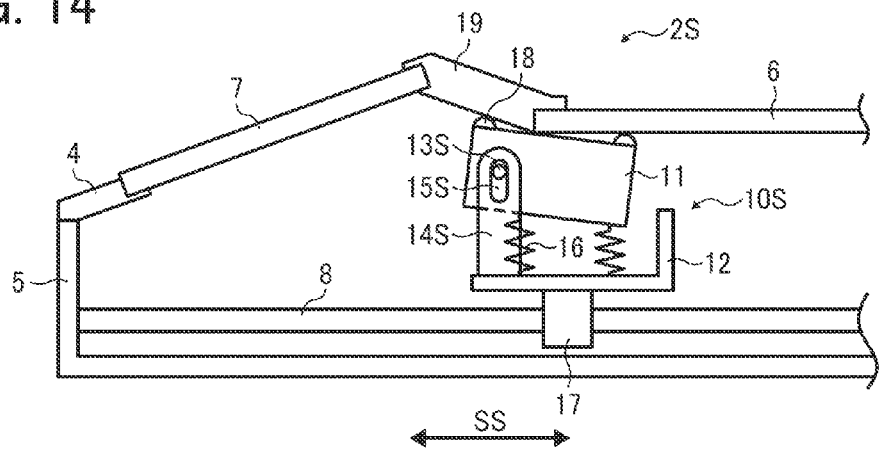
FIG. 14 is a partial vertical sectional view of the image scanner shown in FIG. 13 illustrating the first reader situated at the intermediate position between the home position and the moving original reading position.
Figure 15:
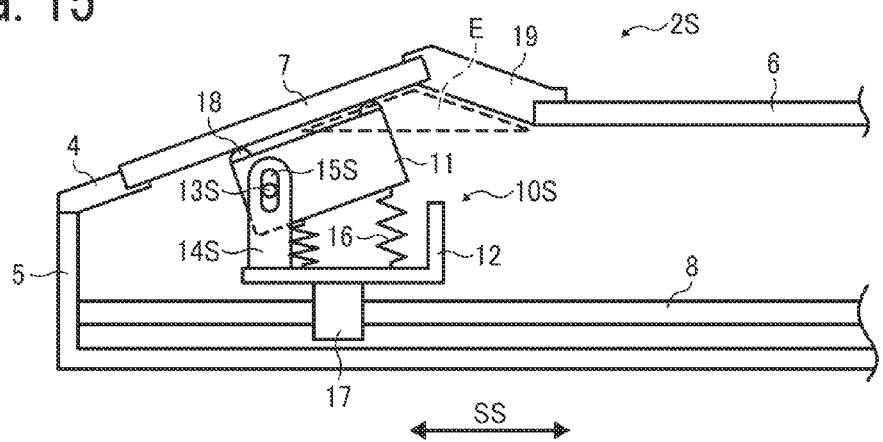
FIG. 15 is a partial vertical sectional view of the image scanner shown in FIG. 13 illustrating the first reader situated at the moving original reading position.

With reference to FIGS. 13 to 15, a description is provided of movement of the first reader 10S.

FIG. 13 is a partial vertical sectional view of an image scanner 2S illustrating the first reader 10S incorporated therein and situated at the home position. FIG. 14 is a partial vertical sectional view of the image scanner 2S illustrating the first reader 10S situated at the intermediate position between the home position shown in FIG. 13 and the moving original reading position. FIG. 15 is a partial vertical sectional view of the image scanner 2S illustrating the first reader 10S situated at the moving original reading position.

In order to read the image on the original P conveyed through the ADF 3, the first reader 10S moves from the home position shown in FIG. 13 in the direction D through the intermediate position shown in FIG. 14 to the moving original reading position shown in FIG. 15. As the first reader 10S halts below the glass strip 7 at the moving original reading position shown in FIG. 15, the first reader 10S reads the image on the original P conveyed by the conveyance roller pair 33 depicted in FIG. 6 and moving over the glass strip 7.

Unlike the pins 13 and 13A of the first reader 10, serving as pivots of the optical scanner unit 11, mounted on the center of the respective side faces 11b of the optical scanner unit 11 in the sub-scanning direction SS as shown in FIG. 8, the pins 13S and 13AS of the first reader 10S situated in proximity to the downstream face 11c of the optical scanner unit 11 as shown in FIG. 12 decrease the height of the image scanner 2S, downsizing the image scanner 2S.

With reference to FIGS. 16 to 19, a detailed description is now given of a configuration of the first reader 10S that downsizes the image scanner 2S.

Figure 16:
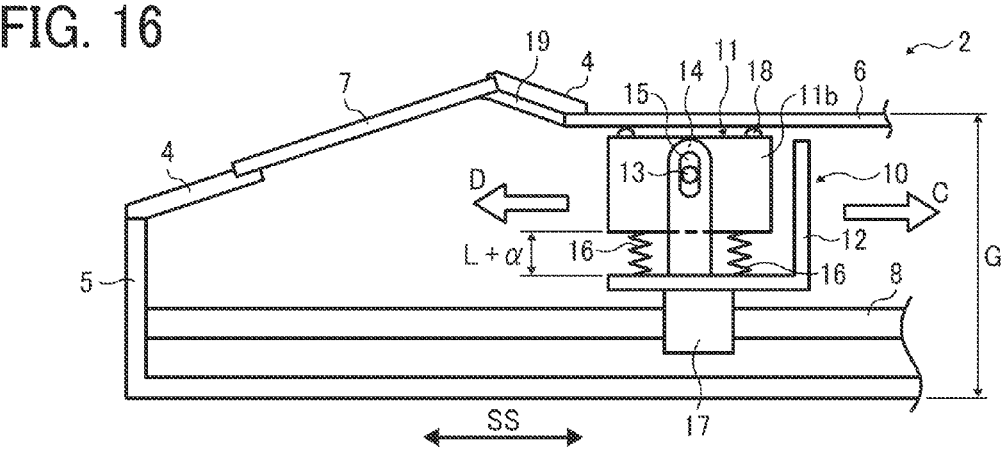
FIG. 16 is a partial vertical sectional view of the image scanner shown in FIG. 9 illustrating the first reader situated at the home position.
Figure 17:
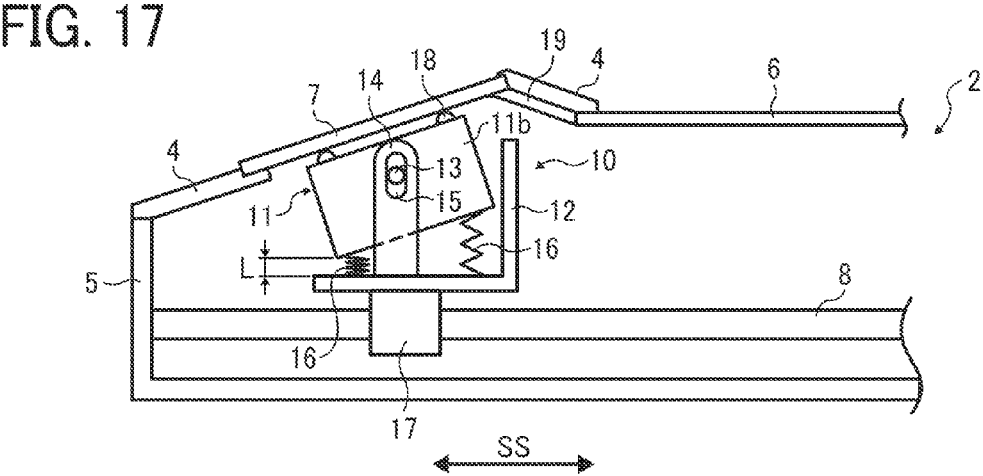
FIG. 17 is a partial vertical sectional view of the image scanner shown in FIG. 11 illustrating the first reader situated at the moving original reading position.
Figure 18:
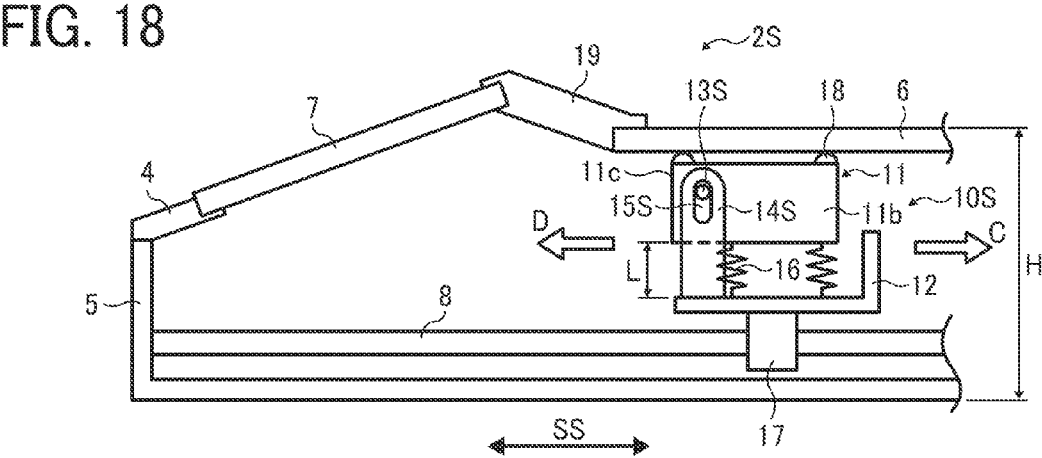
FIG. 18 is a partial vertical sectional view of the image scanner shown in FIG. 13 illustrating the first reader situated at the home position.
Figure 19:
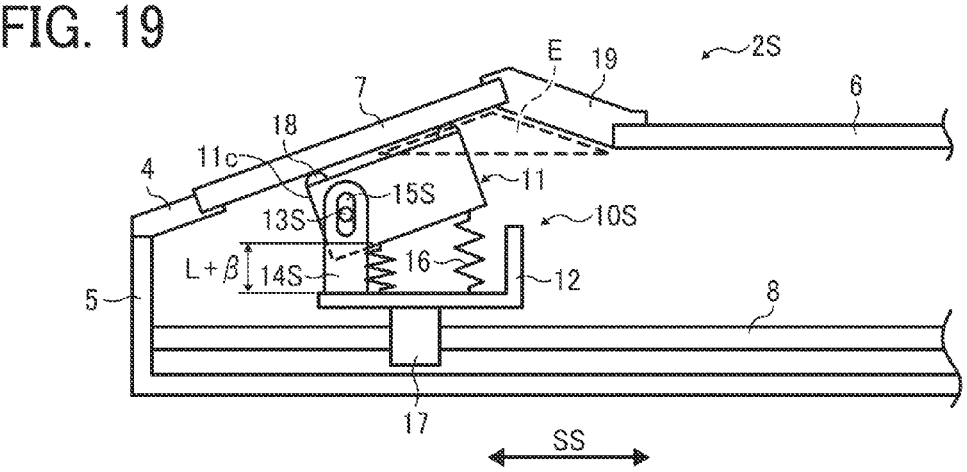
FIG. 19 is a partial vertical sectional view of the image scanner shown in FIG. 15 illustrating the first reader situated at the moving original reading position.

FIG. 16 is a partial vertical sectional view of the image scanner 2 illustrating the first reader 10 situated at the home position. FIG. 17 is a partial vertical sectional view of the image scanner 2 illustrating the first reader 10 situated at the moving original reading position. FIG. 18 is a partial vertical sectional view of the image scanner 2S illustrating the first reader 10S situated at the home position. FIG. 19 is a partial vertical sectional view of the image scanner 2S illustrating the first reader 10S situated at the moving original reading position.

As shown in FIGS. 16 and 17, the pin 13 serving as a pivot of the optical scanner unit 11 is mounted on the center of one side face 11b of the optical scanner unit 11 at a position interposed between the springs 16 in the sub-scanning direction SS. Similarly, the pin 13A serving as a pivot of the optical scanner unit 11 is mounted on the center of another side face 11b of the optical scanner unit 11 at a position interposed between the springs 16 in the sub-scanning direction SS. Accordingly, when the first reader 10 is at the home position shown in FIG. 16, the length of the respective springs 16 is defined as a minimum length L plus α.

A detailed description is now given of the length of the respective springs 16.

As the first reader 10 moves from the home position shown in FIG. 16 in the direction D to the moving original reading position under the glass strip 7 shown in FIG. 17, the optical scanner unit 11 pivots about the pins 13 and 13A counterclockwise, compressing the left, downstream spring 16 and expanding the right, upstream spring 16. The minimum length L of the respective springs 16 is specific and preset individually.

With reference to FIGS. 20A, 20B, and 20C, a detailed description is now given of the minimum length L of the springs 16.

FIG. 20A is a diagram illustrating the spring 16 applied with no force. As shown in FIG. 20A, the spring 16 has a length L1 when the spring 16 is applied with no force. FIG. 20B is a diagram illustrating the spring 16 applied with a force. An available range AR defines a range in which a stress not greater than an allowable torsional stress is applied to the spring 16 as the spring 16 is compressed. If the length of the compressed spring 16 is in the available range AR, the spring 16 causes a proper resilience.

An available lower limit L2 defines a length below which the compressed spring 16 is applied with a stress greater than the allowable torsional stress and at the worst the spring 16 is broken. FIG. 20C is a diagram illustrating the spring 16 applied with a substantial force. A solid length L3 defines a length of the spring 16 compressed to the limit. If the spring 16 is compressed to have the solid length L3, the spring 16 no longer has resiliency and therefore does not achieve its function. Accordingly, the minimum length L of the spring 16 defines a minimum length above which the spring 16 causes a proper resilience, that is, the available lower limit L2 or the solid length L3.

For example, when the first reader 10 halts at the moving original reading position below the glass strip 7 as shown in FIG. 17, the left, downstream spring 16 compressed by the optical scanner unit 11 should have a length greater than the minimum length L. It is because if the compressed left, downstream spring 16 has a length smaller than the minimum length L, that is, the solid length L3, a resilience of the left, downstream spring 16 is smaller than a resilience of the right, upstream spring 16 and therefore the left, downstream spring 16 does not press the optical scanner unit 11 against the glass strip 7 precisely. Accordingly, the optical axis of light emitted from the optical scanner unit 11 is oblique to the glass strip 7, not perpendicular to the glass strip 7, resulting in faulty reading of the image on the original P by the optical scanner unit 11. Further, if the minimum length L is the available lower limit L2, at the worst, the spring 16 may be broken and therefore replacement of the first reader 10 may be needed.

To address this problem, when the first reader 10 is at the home position shown in FIG. 16, the length of the spring 16 is the minimum length L plus α. In contrast, as shown in FIGS. 18 and 19, the pin 13S serving as a pivot of the optical scanner unit 11 is mounted on one side face 11b of the optical scanner unit 11 at the position in proximity to the downstream face 11c of the optical scanner unit 11. Similarly, the pin 13AS serving as a pivot of the optical scanner unit 11 is mounted on another side face 11b of the optical scanner unit 11 at the position in proximity to the downstream face 11c of the optical scanner unit 11. The left, downstream spring 16 and the right, upstream spring 16 are situated upstream from the pins 13S and 13AS in the direction D in which the first reader 10S moves from the home position to the moving original reading position. Accordingly, when the first reader 10S is at the home position shown in FIG. 18, the length of the respective springs 16 is the minimum length L.

A detailed description is now given of the length of the respective springs 16 equivalent to the minimum length L.

As the first reader 10S moves from the home position shown in FIG. 18 in the direction D to the moving original reading position below the glass strip 7 shown in FIG. 19, the optical scanner unit 11 pivots about the pins 13S and 13AS counterclockwise, expanding the left, downstream spring 16 and the right, upstream spring 16 situated upstream from the pins 13S and 13AS in the direction D. When the first reader 10S is at the moving original reading position below the glass strip 7, the left, downstream spring 16 and the right, upstream spring 16 are not compressed further than at the home position. Accordingly, unlike the compressed springs 16 of the first reader 10 at the moving original reading position shown in FIG. 17, the springs 16 of the first reader 10S at the moving original reading position shown in FIG. 19 need not satisfy the minimum length L. Consequently, when the first reader 10S is at the home position shown in FIG. 18, the springs 16 have the minimum length L.

As shown in FIGS. 16 and 18, the length of the springs 16 changes the height of the image scanners 2 and 2S. For example, with the image scanner 2 shown in FIG. 16, the length L plus α of the springs 16 at the home position of the first reader 10 changes a height G of the image scanner 2. With the image scanner 2S shown in FIG. 18, the length L of the springs 16 at the home position of the first reader 10S changes a height H of the image scanner 2S.

As shown in FIGS. 18 and 19, the image scanner 2S incorporates the pins 13S and 13AS situated in proximity to the downstream face 11c of the optical scanner unit 11. Accordingly, the springs 16 are configured to have the minimum length L when the first reader 10S is at the home position shown in FIG. 18. Consequently, the height H of the image scanner 2S is reduced by a length a compared to the height G of the image scanner 2 incorporating the pins 13 and 13A situated at the center of the side faces 11b of the optical scanner unit 11 in the sub-scanning direction SS, respectively, as shown in FIG. 16, resulting in downsizing of the image scanner 2S.

With reference to FIG. 21, a description is provided of an angle of the slope 19.

FIG. 21 is a partial vertical sectional view of the image scanner 2S illustrating the first reader 10S coming into contact with a boundary between the glass strip 7 and the slope 19. As the first reader 10S moves from the moving original reading position below the glass strip 7 in the direction C to return to the home position below the exposure glass 6, the leading bosses 18, that is, the right bosses 18 in FIG. 21, come into contact with the slope 19. Accordingly, the optical scanner unit 11 is applied with a force that rotates the optical scanner unit 11 about the pins 13S and 13AS. To address this circumstance, the opposed face 19a of the slope 19 is angled at a given angle to produce a moment M that rotates the optical scanner unit 11 about the pins 13S and 13AS clockwise in FIG. 21, thus facilitating movement of the first reader 10S to the home position below the exposure glass 6.

Conversely, if the opposed face 19a of the slope 19 is angled at an angle to produce a moment opposite the moment M, that rotates the optical scanner unit 11 about the pins 13S and 13AS counterclockwise in FIG. 21, as the first reader 10S moves to the home position below the exposure glass 6, the bosses 18 may be caught in a compartment E depicted in FIG. 15 created by the glass strip 7 and the slope 19, producing a resistance that obstructs movement of the first reader 10S to the home position below the exposure glass 6.

With reference to FIGS. 9 and 13, a description is provided of advantages of the image scanners 2 and 2S.

The respective image scanners 2 and 2S include a transparent, stationary original plate (e.g., the exposure glass 6) on which a stationary original P is placed; a transparent, moving original plate (e.g., the glass strip 7) over which a moving original P is conveyed; and a reader (e.g., the first readers 10 and 10S) movably disposed opposite the stationary original P and the moving original P via the stationary original plate and the moving original plate, respectively, to read an image on either the stationary original P or the moving original P. The opposed face 7a of the moving original plate disposed opposite the reader is tilted relative to the opposed face 6a of the stationary original plate disposed opposite the reader by the given angle β. The reader contacts and moves along the opposed face 6a of the stationary original plate and the opposed face 7a of the moving original plate.

That is, even if the respective image scanners 2 and 2S are connected to the straight conveyance path 35 depicted in FIG. 6 that receives the moving original P from the respective image scanners 2 and 2S, the reader moves along the opposed face 6a of the stationary original plate and the opposed face 7a of the tilted moving original plate. Accordingly, the reader is disposed opposite the stationary original P and the moving original P with a constant given interval therebetween. Further, light emitted from the reader irradiates the stationary original P and the moving original P perpendicularly. Thus, the single reader reads the image on the stationary original P and the moving original P precisely.

The present invention has been described above with reference to specific example embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative example embodiments may be combined with each other and/or substituted for each other within the scope of the present invention.

What is claimed is:

1. An image scanner comprising:
a stationary original plate on which a stationary original is placed;
a moving original plate, over which a moving original is conveyed, aligned with the stationary original plate in a sub-scanning direction and tilted relative to the stationary original plate by a given angle; and
a reader movable in the sub-scanning direction between a stationary original reading span disposed opposite the stationary original via the stationary original plate to read an image on the stationary original and a moving original reading position disposed opposite the moving original via the moving original plate to read an image on the moving original,
the reader pressingly contacting the stationary original plate and the moving original plate as the reader moves in the sub-scanning direction.

2. The image scanner according to claim 1, wherein the reader reads the image on the stationary original while the reader moves over the stationary original reading span and reads the image on the moving original while the reader halts at the moving original reading position.

3. The image scanner according to claim 1, further comprising a guide rod slidably mounting and guiding the reader moving in the sub-scanning direction.

4. The image scanner according to claim 3, wherein the guide rod extends parallel to the stationary original plate.

5. The image scanner according to claim 3, wherein the reader includes:
a support slidably mounted on the guide rod; and
a scanner assembly rotatably and vertically movably supported by the support.

6. The image scanner according to claim 5, wherein the support includes a bracket.

7. The image scanner according to claim 5, wherein the scanner assembly includes a contact image scanner.

8. The image scanner according to claim 5, wherein the scanner assembly includes an optical scanner unit including:
a light source to emit light onto the stationary original and the moving original;
a lens through which the light reflected by the stationary original and the moving original passes; and
a charge-coupled device to read the light travelling from the lens into an electric signal.

9. The image scanner according to claim 5, wherein the reader further includes a plurality of biasing members anchored to the support and the scanner assembly to bias the scanner assembly against the stationary original plate and the moving original plate.

10. The image scanner according to claim 9, wherein each of the plurality of biasing members includes a spring.

11. The image scanner according to claim 9, wherein the reader further includes a plurality of bosses mounted on and projecting from an opposed face of the scanner assembly that is disposed opposite the stationary original plate and the moving original plate, the plurality of bosses pressed against the stationary original plate and the moving original plate by the plurality of biasing members.

12. The image scanner according to claim 11, wherein the plurality of bosses retains an interval between the scanner assembly and the stationary original plate identical to an interval between the scanner assembly and the moving original plate as the reader moves in the sub-scanning direction.

13. The image scanner according to claim 9,
wherein the support includes an arm mounted on each lateral end of the support in a main scanning direction orthogonal to the sub-scanning direction and projecting toward the scanner assembly, the arm including an elongate through-hole,
wherein the reader further includes a pin mounted on each side face of the scanner assembly and movably engaging the elongate through-hole of the support, and
wherein the scanner assembly is rotatable about the pin and vertically movable as the pin moves in the elongate through-hole.

14. The image scanner according to claim 13, wherein the pin is mounted on a center in the sub-scanning direction of each side face of the scanner assembly and the elongate through-hole is at a center in the sub-scanning direction of each lateral end of the support.

15. The image scanner according to claim 14, wherein the pin is interposed between the plurality of biasing members in the sub-scanning direction.

16. The image scanner according to claim 13, wherein the pin is mounted on each side face of the scanner assembly at a position in proximity to a downstream face of the scanner assembly that faces the moving original plate.

17. The image scanner according to claim 16, wherein the pin is situated downstream from the plurality of biasing members in a direction in which the reader moves from the stationary original reading span to the moving original reading position.

18. The image scanner according to claim 1, further comprising a slope bridged across the stationary original plate and the moving original plate and having an opposed face disposed opposite the reader moving between the stationary original reading span and the moving original reading position,
wherein the opposed face of the slope forms an identical surface with an opposed face of each of the stationary original plate and the moving original plate.

19. The image scanner according to claim 1, wherein each of the stationary original plate and the moving original plate is made of a transparent material.

20. An image forming apparatus comprising the image scanner according to claim 1.

* * * * *